United States Patent [19]

Staniland et al.

[11] Patent Number: 5,051,495

[45] Date of Patent: Sep. 24, 1991

[54] PRODUCTION AND/OR HANDLING OF ARYL POLYETHERS AND THIOETHERS POLYMERS

[75] Inventors: Philip Staniland, Middlesbrough; Arthur H. Gilbert, Stockton on Tees; Ian R. M. Henderson, Stokesley, all of England

[73] Assignee: Imperial Chemical Industries PLC, London, England

[21] Appl. No.: 195,610

[22] Filed: May 18, 1988

[30] Foreign Application Priority Data

May 18, 1987 [GB] United Kingdom ............... 8711685
May 18, 1987 [GB] United Kingdom ............... 8711686

[51] Int. Cl.⁵ .................... C08G 65/40; C08G 75/00
[52] U.S. Cl. ................................. 528/499; 528/174; 528/218; 528/219; 528/374; 523/332
[58] Field of Search ............ 528/499, 218, 374, 174, 528/219; 523/332

[56] References Cited

U.S. PATENT DOCUMENTS

| Re. 29,489 | 12/1977 | Newton | 568/33 |
|---|---|---|---|
| 3,478,000 | 11/1969 | Saunders et al. | 528/499 |
| 4,089,847 | 5/1978 | Edmonds, Jr. et al. | 528/374 |
| 4,102,875 | 7/1978 | Campbell | 528/388 |
| 4,105,636 | 8/1978 | Taylor | 528/218 |
| 4,113,698 | 9/1978 | Staniland | 528/218 |
| 4,202,965 | 5/1980 | Shimizu et al. | 528/499 |
| 4,237,265 | 12/1980 | Eliassen et al. | 528/499 |
| 4,239,884 | 12/1980 | Dahl | 528/499 |
| 4,301,274 | 11/1981 | Campbell | 528/388 |
| 4,320,224 | 3/1982 | Rose | 528/128 |
| 4,321,174 | 3/1982 | Hoy et al. | 528/499 |
| 4,360,662 | 11/1982 | Williams | 528/499 |
| 4,400,499 | 8/1983 | Colon | 528/218 |
| 4,421,874 | 12/1983 | Seefluth | 523/315 |
| 4,460,764 | 7/1984 | Reffert et al. | 528/499 |
| 4,463,164 | 7/1984 | Dalton et al. | 528/499 |
| 4,730,034 | 3/1988 | Nesheiwat et al. | 528/499 |
| 4,732,968 | 3/1988 | Obayashi et al. | 528/499 |
| 4,734,484 | 3/1988 | Alfes | 528/502 |
| 4,841,018 | 6/1989 | Gaughan | 528/374 |

FOREIGN PATENT DOCUMENTS

| 0113261 | 3/1984 | European Pat. Off. . | |
| 0202537 | 11/1986 | European Pat. Off. . | |
| 2803873 | 8/1978 | Fed. Rep. of Germany | 528/219 |
| 1563222 | 3/1980 | United Kingdom . | |

Primary Examiner—John Kight, III
Assistant Examiner—Dennis R. Daley
Attorney, Agent, or Firm—Cushman, Darby & Cushman

[57] ABSTRACT

In making polyarylethersulphones or polyaryletherketones or their thioanalogues by reaction of phenols with aromatic halogen compounds, raw polycondensation product is freed of alkali halide by adjusting its composition and/or temperature so that it dissolves at least 0.5% w/w of water and holds the polymer in solution, and then contacting it in liquid form with hot water, preferably under pressure.

12 Claims, 1 Drawing Sheet

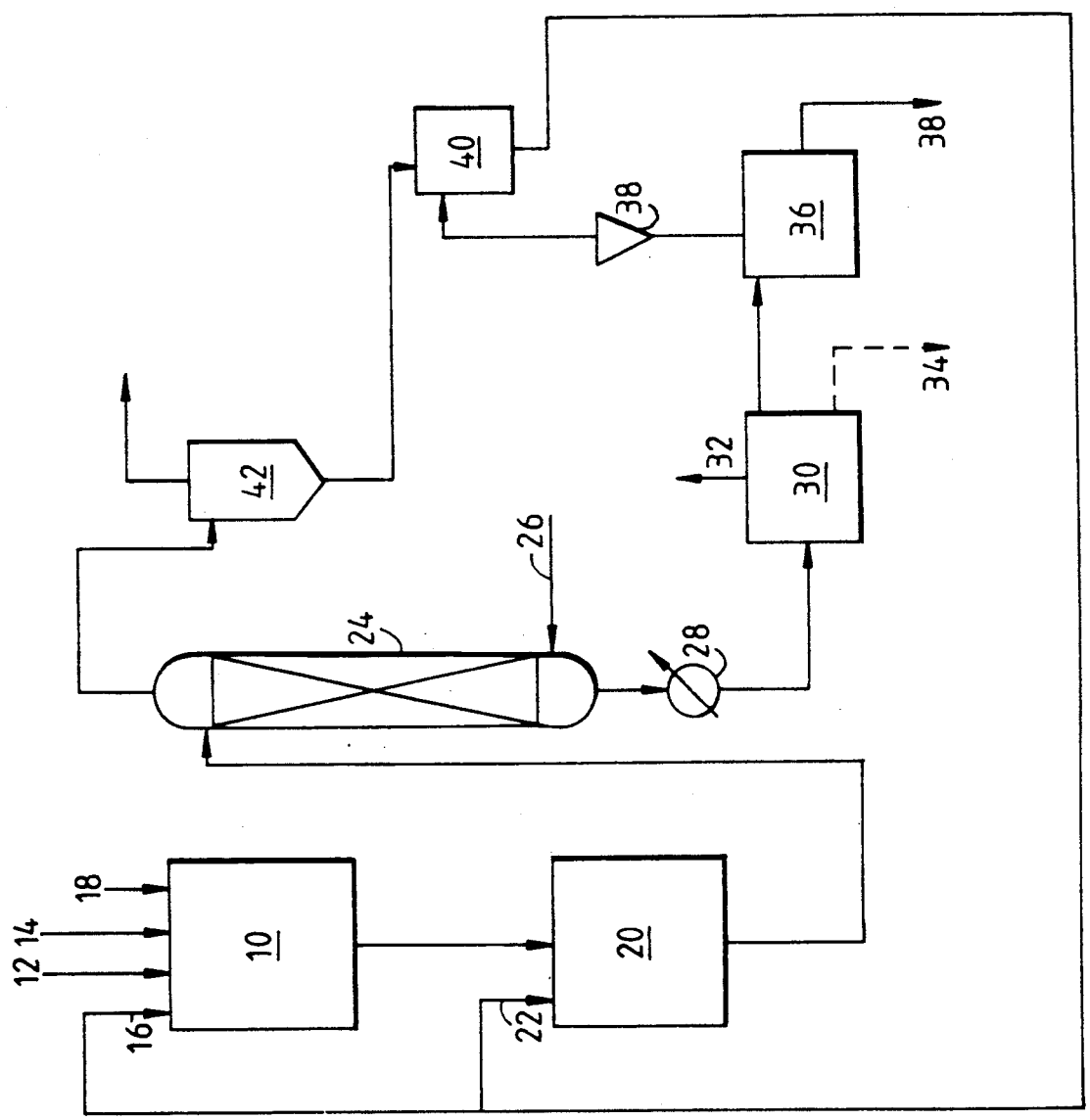

PRODUCTION AND/OR HANDLING OF ARYL POLYETHERS AND THIOETHERS POLYMERS

This invention relates to a process and apparatus for the production and/or handling of aryl polyethers and thioethers, particularly for removing salts therefrom.

In one example of the field of the invention aromatic polyethers are produced by reacting together haloaromatic and phenolic compounds with elimination of hydrogen halide, and the raw polycondensation product contains salt in fine solid particles. It has, for example in GB-A 1563222 been proposed to remove such salt by allowing the raw product to cool and solidify, grinding it finely and washing the with water. This procedure is inconvenient owing to the need to handle solids.

According to the invention a washing process for removing inorganic salt from an aryl polyether or thioether phase containing it is characterised in that the phase is provided in liquid form and the composition and/or temperature is adjusted so that it dissolves water to the extent of at least 0.5% w/w on the total of the polymer phase, salt and other materials present after said adjustment.

In a preferred aspect of the invention a process for producing an aryl polyether or thioether comprises polycondensing in the presence of at least one basic alkali metal compound at least one bisphenol, bisthiophenol or hydroxyphenyl mercaptan or source of sulphide ions with at least one dihalobenzenoid compound, and/or of a halophenol or halothiophenol with itself and/or with at least one other halophenol or halothiophenol, whereby alkali halide is formed as a co-product, and separating alkali halide from the resulting polymer phase by contacting it with water:

characterised in that said phase is provided in liquid form and the composition and/or temperature is adjusted so that water dissolves therein to the extent of at least 0.5% by weight on the total of said phase and other materials present after said adjustment.

In a particular form of the invention a process for producing an aromatic polythioether comprises polycondensing an aromatic dihalocompound with alkali metal sulphide, whereby alkali halide is formed as a co-product, and separating the alkali halide from the resulting polymer phase by contacting it with water, characterised in that said phase is provided in liquid form and in that the composition and/or temperature is adjusted so that water dissolves therein to the extent of at least 0.5% by weight on the total of said phase and other materials present after said adjustment.

That which is present after said adjustment will be referred to hereinafter as "material".

The contacting with liquid water can be applied to a polymer phase brought to liquid state by melting and/or dissolution. Preferably it is applied to the product of the polycondensation possibly after adjustment of temperature and/or addition of solvent, but before cooling to solidification temperature; this makes continuous operation possible.

The form of the material to be contacted can be for example a thin film on a supporting belt. More conveniently it is subdivided into droplets of average diameter for example up to 3 mm especially 0.05 to 0.5 mm, and these are fed into liquid water preferably in a moving stream. Very suitably they are sized to as to be fed downwardly into a column in which water is circulated upwardly, so that counter-current extraction takes place. If they are small enough they can be fed upwardly in a column and separated at the top so that co-current extraction takes place. Counter-current and co-current stages can be used in succession, in any order. In any such extraction, contacting efficiency can be improved by baffles and/or packing and/or by mechanical stirring.

To effect the required subdivision the material is fed for example through a spinneret, possibly with a cutter, or through a nozzle at the outlet of which it encounters a fast moving fluid such as water or steam or nitrogen.

The combination of such feed means, subdividing means and contacting means is believed to be new, as are the further combinations with one or more polycondensation reactors and any intermediate treating means. These constitute apparatus according to the invention.

In another mode of operation the material can be sheared in presence of liquid water, using for example a screw extruder, mixer or blade. In yet another mode the material is dispersed into a stirred body of water, and allowed to settle out, whereafter the water is taken off.

In any mode of operation the material can be contacted stagewise with fresh supplies of clean water; possibly spent water from later stages can be fed to earlier stages. If desired, in continuous operation droplets can be coalesced and re-subdivided between contacting stages; and provision should be made to re-subdivide any material that coalesces accidentally. Especially if solvent is removed by water contacting, more may be added at re-subdivision.

After the water contacting stage the material is separated from the water and is freed from dissolved and/or entrained water preferably by distillation, for example by flashing. If it contains a solvent it may be passed to solvent removal; if the solvent is volatile it is removed preferably by distillation, suitably at subatmospheric pressure and with agitation. If desired, solvent removal can be by extraction with volatile liquid for example a lower alcohol or ketone. In this event, after the last stage of water contacting, coalesence of polymer droplets is preferably avoided.

Polycondensation solvent separated as above is preferably recycled to polycondensation or to viscosity adjustment.

The water contacting is at preferably over 100° C. and thus is at superatmospheric pressure. Such conditions may be desirable in view of the properties of the polymer, but they are especially advantageous in increasing the solubility of water in the liquid material and thus facilitating dissolving of the salt. It is believed that extraction of the salt is most efficient when the conditions permit osmotic flow of water into the droplets at such a rate that, as the salt particles dissolve, the resulting solution undergoes dilution and expansion until it bursts through the polymer: consequently, although inward flow of water may be slow as a diffusion process, removal of salt solution does not depend on ionic diffusion and is very rapid. Preferably the material dissolves water to the extent of 2-10% w/w.

Preferred contacting temperatures are in the range 150° to 250° especially 180-220°, particularly at least 200° C.; the corresponding pressures are 4.8-40 bar abs especially 10-23 bar abs, particularly at least 15.3, bar abs.

In the polycondensation of polyethers the preferred bisphenols include hydroquinone and those of formula

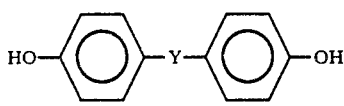

in which Y is a direct link, oxygen, sulphur, —SO₂—, —CO—, or a divalent hydrocarbon radical.

Particularly preferred bisphenols include
4,4'-dihydroxybenzophenone
4,4-dihydroxydiphenylsulphone
2,2-bis-(4-hydroxyphenyl)propane
4,4'-dihydroxybiphenyl
4,4'-dihydroxydiphenyl sulphide Mixtures of bisphenols may be employed so as to produce copolymers. The dihalobenzenoid compounds preferably have the formula

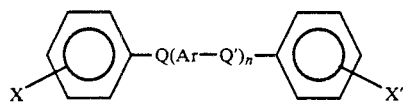

in which X and X', which may be the same or different, are halogen atoms and are ortho or para to the groups Q and Q';

Q and Q', which may be the same or different, are —CO— or —SO₂—;

Ar is a divalent aromatic radical; and n is 0, 1, 2 or 3.

The aromatic radical Ar is preferably selected from phenylene, biphenylene or terphenylene.

Particularly preferred dihalobenzenoids have the formula

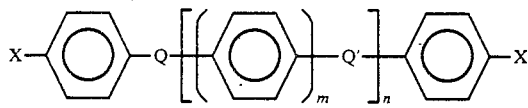

where m is 1, 2 or 3.

Examples of suitable dihalobenzenoids include
4,4'-dichlorodiphenylsulphone
4,4'-difluorodiphenylsulphone
4,4'-dichlorobenzophenone
4,4'-difluorobenzophenone
4-chloro-4'-fluorodiphenylsulphone
4-chloro-4'-fluorobenzophenone
bis-4,4'-(4-chlorophenylsulphonyl)biphenyl
bis-4,4'-(4-chlorobenzoyl)biphenyl Mixtures of dihalobenzenoids may be employed so as to produce copolymers. Examples of mixtures that may be employed include 4,4'-dichlorodiphenylsulphone with 4,4'-dichlorobenzophenone or bis-4'-(4-chlorophenylsulphonyl)biphenyl.

Preferred halophenols are those of formula

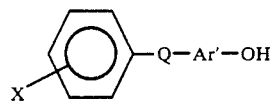

where X is halogen and is ortho or para to Q;

Q is —SO₂— or —CO—; and

Ar' is an aromatic radical; and

—OH is preferably para to the group Q.

The aromatic radical Ar' is preferably selected from phenylene, biphenylene, and radicals of the formula

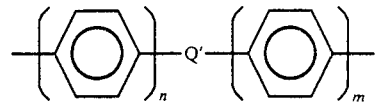

where Q' is —CO— or —SO₂—; and n and m, which may be the same or different, are integers selected from 1, 2 and 3. Particularly preferred halophenols have the formula

where p is 0 or 1.

Examples of suitable halophenols include
4-(4-chlorophenylsulphonyl)phenol
4-(4-fluorophenylsulphonyl)phenol
4-(4-chlorobenzoyl)phenol
4-hydroxy-4'-(4-chlorophenylsulphonyl)biphenyl
4-(4-hydroxyphenylsulphonyl)-4'-(4-chlorophenylsulphonyl)biphenyl.

Mixtures of halophenols may be employed to produce copolymers. Examples of mixtures that may be employed include 4-(4-chlorophenylsulphonyl)phenol with one or more of 4-(4-chlorobenzoyl)phenol, 4-hydroxy-4'-(4-chlorophenylsulphonyl)biphenyl, and 4-(4-hydroxyphenylsulphonyl)-4'-(4-chlorophenylsulphonyl)-biphenyl.

Equally mixtures of one or more halophenols with a substantially equimolar mixture of a dihalobenzenoid and a bisphenol may be employed. As an example there may be mentioned 4-(4-chlorobenzoyl)phenol in admixture with 4,4'-dichlorodiphenyl-sulphone and 4,4'-dihydroxydiphenyl sulphone.

In addition to the above halobenzenoids, those usable include compounds not having an activating group, for example as described in our co-pending GB application 8527756, provided a copper-containing catalyst is present.

Polyaryl thioethers may be prepared by condensation of thioanalogues of the aforementioned phenols. For example 4,4'-dichlorodiphenyl sulphone and the potassium salt of 4,4'-dimercapto diphenyl sulphone may be condensed with the elimination of KCl.

Condensation of polymers that are amorphous or at most 5% crystalline affords liquid materials to be subjected to water washing which contain polymers at least 95% of which are in solution. Generally these result from a high proportion of SO₂ groups; in particular, when SO₂ and CO are present, SO₂ constitutes at least 90% by moles of the total of SO₂ and CO.

Alternatively the process of this invention may be used for production of polyaryletherketones that are 10–30% crystalline. In this case the liquid material subjected to water washing may contain polymer more than 5% of which is out of solution. This appear to cause no fundamental difficulty, since crystalline polymer need not occlude the alkali halide. Generally, such crystalline polymer results from a relatively high proportions of CO groups: in particular, when SO₂ and CO are present, CO constitutes over 10% preferably at least 50% by moles of the total of $SO_2$ and CO.

By "crystalline" is meant at least 5% crystalline as measured by X-ray crystallography or a method correlatable therewith such as density or latent heat of fusion. At and above this level of crystallinity the polymer is incompletely if at all soluble in the organic solvents set out below, and consequently the material contacted with the water is a slurry.

The reaction may be carried out in the presence of a polycondensation solvent; if so, then preferably this is an aliphatic or aromatic sulphoxide or sulphone of formula

where x is 1 or 2; and

R and R' are alkyl or aryl groups and may be the same or different;

R and R' may together form a divalent radical.

Preferred solvents include dimethyl sulphoxide, dimethyl sulphone, sulpholane (1,1 dioxothiolan), and aromatic sulphones of the formula

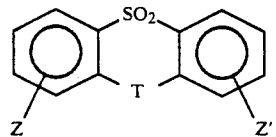

where T is a direct link, an oxygen atom or two hydrogen atoms (one attached to each benzene ring) and Z and Z', which may be the same or different, are hydrogen atoms or phenyl groups.

Examples of such aromatic sulphones include diphenylsulphone, dibenzothiophen dioxide, phenoxathiin dioxide and 4-phenylsulphonyl biphenyl. If desired, there may be present a solvent effective to remove water by azeotropic distillation.

If the polycondensation solvent used is highly soluble in water in the conditions to be used in contacting it is preferably removed before contacting. For viscosity adjustment a solvent of low solubility in water at contacting temperature suitably under 50%, especially under 20% by weight may then be added.

The above mentioned aromatic sulphone solvents are especially preferred since they are suitable as polycondensation solvents and have the desired water-dissolving property. They are also readily phase-separated from spent contacting water. If contacting is to be at over 100° C. any volatile solvent used in polycondensation is preferably removed before the contacting and possibly replaced by non volatile solvent.

The basic alkali metal compound can be introduced as a phenate salt of the bisphenol or halophenol, but preferably is introduced as a carbonate or bicarbonate. A single alkali metal carbonate or bicarbonate can be used, preferably of potassium, but more suitably sodium carbonate or bicarbonate is used in admixture with a carbonate or bicarbonate of an alkali metal of higher atomic number. The higher alkali metal carbonates or bicarbonates are selected from those of potassium, rubidium and caesium, preferably potassium.

Usually alkali equivalent to 1 to 1.2 atoms of alkali metal is used per phenol group but more can be used if it is desired to increase the speed of the polycondensation reaction and if there is no other disadvantage. As a result, the reacted polycondensation mixture contains inorganic halide and possibly unreacted basic compound or reaction products.

To assist extraction of the halide and any basic compounds the contacting water can contain appropriate concentrations of acid or alkali or neutral salts. Such salts may also be useful in limiting dissolution of solvent from the material being extracted.

The polycondensation temperature is typically in the range 100° to 400° C. and will depend on the nature of the reactants and the solvent, if any, employed. Thus when using very reactive condensants, such as 4,4'-difluorodiphenylsulphone in admixture with 4,4'-dihydroxydiphenylsulphone, temperatures of the order of 100° to 140° C. may be used. For reactant combinations such as 4,4'-dichlorodiphenylsulphone and 2,2-bis(4-hydroxyphenyl)propane, temperatures of the order of 140° to 180° C. are suitable but for systems such as 4,4'-dihalodiphenylsulphone/4,4'-dihydroxydiphenylsulphone, and the ketone analogues, temperatures above of 250° C., preferably above 270° C., are generally desirable. For the production of some polymers, it may be desirable to start polycondensation at one temperature, e.g. between 200° and 250° C. and to increase the temperature progressively to maintain the polymer in solution as its molecular weight increases.

To minimise cleavage reactions it is preferred that the maximum polycondensation temperature be below 350° C.

If desired, the polycondensation can be conducted in presence of a copper-containing catalyst. Using activated halobenzenoids the temperature may be for example 50° C. lower than in absence of such catalyst; alternatively non-activated halobenzenoids can be used. Then the water contacting stage of the process of the invention should include also one or more stages of copper compound removal, by contacting with dilute acid and/or ammonia and/or a chelating agent. For such stages the polymer phase is also advantageously in liquid form.

The polycondensation reaction may if desired be terminated by mixing an end stopping reagent e.g. a mono or polyfunctional halide such as methyl chloride, t-butyl chloride or 4,4'-dichlorodiphenylsulphone with the reaction mixture at the polycondensation temperature.

For the water contacting the material typically has the following composition % w/w

| | |
|---|---|
| alkali metal compound all or mainly halide) | 2-30 esp 4-15 |
| polymer | 10-50 esp 15-45 |
| solvent | 30-90 esp 45-80 |

The composition is chosen preferably so as to keep the polymer in solution; in producing the required polymer phase from raw polycondensation product care should be taken to avoid precipitation of polymer, e.g. by keeping up the temperature until sufficient further solvent has been added. Before the water-contacting the polymer solution can be filtered to remove part of the alkali halide and any other insolubles.

In the contacting stage the water-to-material ratio is suitably in the range 0.5 to 10; preferably 0.7 to 4 more preferably 0.7 to 1.5, by weight, based on the total use of water if operated in multi stages.

At the inlet of the contacting stage the material and water can be at the same or at different temperatures.

One preferred form of the invention is shown as a flowsheet in the accompanying drawing.

In this process polycondensation section 10 is fed at 12 with a bisphenol reactant, at 14 with a dihalo benzenoid reactant and at 16 with diphenyl sulphone solvent (DPS). These are mixed thoroughly and reacted in the presence of finely powdered alkali metal carbonate fed at 18 slightly more than equivalent to the bisphenol reactant. After completion of polycondensation, possibly with the aid of an end-capping reactant, the product is fed out to vessel 20 in which it is further diluted with DPS 22, whereafter the resulting material is passed into the top of pressurised contacting column 24. In column 24, the material is broken up into small droplets making intimate contact with upwardly flowing hot water fed in at 26. The droplets pass downwards and coalesce at the bottom. The salt-depleted material is heated at 28 to e.g. 180° C. to 240° C., and passed into flash vessel 30, from which water is taken off at 32. The resulting polymer solution can be taken off at 34 if it is desired to use it in further processing, such as composite-making, in which a solvent is required. To produce solvent-free polymer the solution is re-heated and passed to vacuum evaporator 36 in which it is freed of solvent. The resulting stiff polymer is taken out at 38.

The DPS vapour passing overhead from 36 via vacuum pump 38 is condensed, passed to stock tank 40 and recycled to 16 and 22.

The water containing DPS in solution passing overhead from contactor column 24 is cooled, whereby DPS precipitates, and at 42 is separated and from there is passed to stock tank 40.

The invention is further described, but not in any limitative sense, by means of the following Examples.

The term "toffee" refers to a combination of polymer, solvent alkali metal halide and any other products resultant from a polycondensation.

EXAMPLE 1

The effectiveness and the water contacting stage was demonstrated as follows:

To a 4 liter magnetically stirrable autoclave were charged water, solid polycondensation autoclave product "toffee" (300 or 400 g) consisting of polyethersulphone polymer, co-product KCl and diphenyl sulphone solvent, and in some runs a further 200 g of diphenyl sulphone. The autoclave was closed and heated to a temperature in the range 170–230° C. over 1.5 h without stirring. Then stirring was started at 300 or 1000 rpm and continued for 10–30 minutes: as a result the material was kept in finely subdivided form and distributed throughout the water. Then stirring was stopped and the phases allowed to separate; they were then sampled and analysed for potassium. This procedure was repeated by allowing the autoclave to cool, removing the water, rinsing the polymer phase adding fresh water and re-heating.

The contents of the autoclave and agitation speeds for 5 typical runs are set out in Table I. The washing times and temperatures in each run and the potassium ion contents of the treated polymer are shown in Table 2. It is evident that salt removal is highly effective and that an acceptably low level is readily achieved, especially at washing temperatures of at least 200° C.

TABLE I

MATERIALS PRESENT AND AGITATION SPEEDS DURING WASH RUNS

| Run | Toffee g | Added DPS g | Water, per wash g | Agitation rpm |
|-----|----------|-------------|-------------------|---------------|
| A | 400 | 200 | 800 | 1000 |
| B | 400 | none | 800 | 300 |
| C | 400 | none | 800 | 1000 |
| D | 400 | none | 800 | 1000 |
| E | 300 | none | 1000 (see Table 2 note) | 1000 |

TABLE 2

| Run No | | Wash No 1 | 2 | 3 | 4 | 5 | 6 | 7 |
|--------|---|-----|-----|-----|-----|-----|-----|-----|
| A | Time, min | 10 | 10 | 10 | 10 | 10 | — | — |
|   | Temp, °C. | 200 | 200 | 200 | 200 | 200 | — | — |
|   | K(T) | 5564 | 365 | 97 | 86 | 62 | — | — |
|   | K(W) | 3.14 | 0.2 | 0.005 | 0.001 | NM | — | — |
| B | Time, min | 10 | 10 | 10 | 10 | 10 | 10 | 10 |
|   | Temp, °C. | 200 | 200 | 200 | 200 | 200 | 200 | 200 |
|   | K(T) | 18250 | 8790 | 1980 | 800 | 316 | 157 | 103 |
|   | K(W) | 6.7 | 1.35 | 0.16 | 0.05 | 0.02 | 0.005 | 0.003 |
| C | Time, min | 30 | 10 | 10 | 10 | 10 | 10 | 10 |
|   | Temp, °C. | 210–228 | 210–225 | 209–224 | 210–214 | 210–216 | 210–216 | 210 |
|   | K(T) | 27800 | 6100 | 3890 | 597 | 428 | 265 | 58 |
|   | K(W) | 5.1 | 1.2 | 0.25 | NM | NM | NM | NM |
| D | Time, min | 30 | 10 | 10 | 10 | 10 | 10 | 10 |
|   | Temp, °C. | 176–182 | 176–181 | 177–183 | 184–181 | 179–190 | 180–188 | 180–184 |
|   | K(T) | 18215 | 6350 | 1765 | 1150 | 1010 | 580 | 435 |
|   | K(W) | 5.67 | 1.50 | 0.49 | 0.07 | 0.012 | 0.009 | 0.004 |
| E | Time, min | *10 | 10 | 10 | 10 | 10 | 10 | 10 |
|   | Temp, °C. | 210–220 | 210–216 | 210–215 | 210–220 | 210–214 | 210–215 | 210–215 |
|   | K(T) | 6380 | 1090 | 360 | 77 | 70 | 42 | 40 |
|   | K(W) | 3.49 | 0.275 | 0.0125 | 0.007 | 0.005 | 0.0024 | NM |

Notes:
NM = not measured
* = for this wash (but not succeeding washes 2-7) 30 ml of 1N acetic acid was added to the water
K(T) = K$^+$ in toffee, ppm
K(W) + K$^+$ in water % w/w

EXAMPLE 2

Toffee (42.86 g) from a polymer made from 4,4′-difluorobenzophenone and hydroquinone using sodium carbonate, and diphenylsulphone (107.14 g) were placed in a 1.5 l oil-jacketed glass pressure vessel and water (450 ml) was added. The temperature was then raised to 160° C. and stirred at 1200 rpm. It was apparent that the polyetheretherketone was not completely dissolved in the diphenylsulphone. The stirrer and oil heating were switched off after 1 hour. When the mixture had settled the water layer was siphoned off and analysed. This procedure was repeated 3 times.

| Aqueous Extract | [Na] (ppm, w/w) |
|---|---|
| 1st | 3300 |
| 2nd | 300 |
| 3rd | 33 |
| 4th | 10 |

Final toffee [Na] = 34 ppm equivalent to 340 ppm on polymer

EXAMPLE 3

Toffee (34.1 g) (from a polymer made from 4,4′-dihydroxydiphenylsulphone and 4,4′-dichlorophenylsulphonylbiphenyl, in the presence of potassium carbonate), and diphenylsulphone (115.9 g) was placed in a 1.5 l, oil jacketed, glass pressure vessel and water (450 ml) was added. The temperature was raised to 160° C. then the stirrer was started at 1200 rpm. The stirrer and oil heating were switched off after 1 hour. When the mixture had settled and solidified the water layer was siphoned off and analysed. This procedure was repeated 4 times.

| Aqueous Extract | [K] (ppm) |
|---|---|
| 1st | 3400 |
| 2nd | 510 |
| 3rd | 71 |
| 4th | 28 |
| 5th | 15 |

Final toffee [K] = 30 ppm equivalent to 300 ppm on polymer.

EXAMPLE 4

The procedure of Example 3 was followed using a toffee (35.7 g) (produced by polycondensing 4,4′-dihydroxybiphenyl and 4,4′-dichlorodiphenylsulphone in the presence of potassium carbonate) in diphenylsulphone (114.3 g).

| Aqueous Extract | [K] (ppm) |
|---|---|
| 1st | 5300 |
| 2nd | 1000 |
| 3rd | 147 |
| 4th | 30 |
| 5th | 7.5 |

Final toffee [K] = 10 ppm equivalent to 100 ppm on polymer.

EXAMPLE 5

The procedure of Example 3 was followed using a toffee (34.9 g) (made by polycondensing 4,4′-dihydroxydiphenylsulphone and 4,4′-difluorodiphenylsulphone in the presence of potassium carbonate) in diphenylsulphone (115.1 g).

| Aqueous Extract | [K] (ppm) |
|---|---|
| 1st | 3500 |
| 2nd | 190 |
| 3rd | 14 |
| 4th | 3 |
| 5th | 1 |

Final toffee [K] = 7.3 ppm equivalent to 73 ppm on polymer.

COMPARATIVE EXAMPLE

Effect of water solubility in the solvent system model system—water not soluble

A viscous solution (156.44 g), denser than water was made from polymethylmethacrylate (54.75 g) trichloroethane (73.44 g) and toluene (28.25 g). Finely milled (<45μ) KCl (8.96 g) was added and the mixture stirred until the KCl had completely dispersed. Water (300 ml) was added and stirring continued. At intervals shown in the table below the stirrer was stopped and the mixture allowed to settle. A sample of the water layer was pipetted off and analysed. The stirrer was then restarted.

| Time (mins) | KCl (g) | KCl Extracted (%) |
|---|---|---|
| 5 | 5.76 | 64.3 |
| 10 | 6.17 | 68.9 |
| 20 | 6.52 | 72.8 |
| 40 | 6.71 | 74.9 |
| 80 | 6.71 | 74.9 |
| 160 | 6.73 | 75.1 |
| 270 | 6.71 | 74.9 |

INVENTION—WATER SOLUBLE TO APPROXIMATELY 4%

In a 4 l autoclave were placed "Victrex" (Registered Trade Mark) PES toffee (150 g), diphenylsulphone (150 g) and water (1800 g). The temperature was raised to 200° C. A sample was taken and the stirrer started. The stirrer was stopped and further samples taken at times shown in the table below and analysed for KCl.

| Time (mins) | KCl (g) | KCl Extracted (%) |
|---|---|---|
| 0 | 14.16 | 59.3 |
| 5 | 20.79 | 87.05 |
| 10 | 20.79 | 87.05 |
| 20 | 21.05 | 88.14 |
| 40 | 22.32 | 93.46 |
| 80 | 23.85 | 99.86 |
| 136 | 23.86 | 99.91 |

This work showed that it is relatively much easier to extract all the KCl from a system in which there is a significant solubility of water.

We claim:

1. In a process for producing an aryl polyether or polythioether by polycondensing (a) at least one dihalobenzenoid compound with at least one dihydric phenol, dihydric thiophenol or hydroxyphenyl mercaptan in the presence of at least one basic alkali metal compound, or with an alkali metal sulphide; or (b) at least one halophenol or halothiophenol in the presence of at least one basic alkali metal compound whereby alkali halide is formed as a co-product, and separating the alkali halide from the resulting polymer phase by contacting said phase with water, the improvement which comprises (a) providing said phase in liquid form; (b) adjusting the composition and temperature so that water dissolves therein to the extent of at least 0.5% by weight on the total of said phase and other materials present after said adjustment; and (c) contacting the resulting adjusted liquid phase with water.

2. A process as claimed in claim 1, including the steps of dividing the adjusted liquid phase into droplets of average diameter up to 3 mm, and feeding the droplets into liquid water.

3. A process as claimed in claim 2, wherein said diameter is 0.05 to 0.5 mm.

4. A process as claimed in claim 2 wherein the temperature of the water is greater than 100°.

5. A process as claimed in claim 4, wherein said temperature is 150° to 250° C.

6. A process as claimed in claim 5, wherein said temperature is 180° to 220°.

7. A process as claimed in claim 1, wherein the adjusted liquid phase dissolves water to the extent of 2 to 10% by weight.

8. A process according to claim 1 in which the composition of said liquid phase is adjusted by adding an aromatic sulphone of the formula

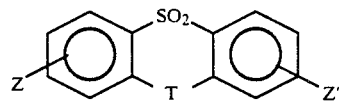

where T is a direct link, an oxygen atom or two hydrogen atoms (1 attached to each benzene ring) and Z and Z', which may be the same or different, are hydrogen atoms or phenyl groups.

9. A process according to claim 1 in which the polycondensation is carried out in the presence of an aromatic sulphone of the formula

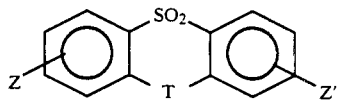

where T is a direct link, an oxygen atom or two hydrogen atoms (1 attached to each benzene ring) and Z and Z', which may be the same or different are hydrogen atoms or phenyl groups.

10. A process according to claim 8 in which aromatic sulphone is recovered from the polymer phase and wash water after said contacting.

11. A process according to claim 10 in which aromatic sulphone is recycled to said composition adjustment.

12. A process according to claim 9 in which aromatic sulphone is recovered from the polymer and wash water after said contacting and is recycled to said polycondensation and said composition adjustment.

* * * * *